United States Patent [19]
Crome

[11] Patent Number: 5,871,624
[45] Date of Patent: Feb. 16, 1999

[54] MODULAR CERAMIC OXYGEN GENERATOR

[75] Inventor: Victor P. Crome, Davenport, Iowa

[73] Assignee: Litton Systems, Inc., Davenport, Iowa

[21] Appl. No.: 20,301

[22] Filed: Feb. 6, 1998

Related U.S. Application Data

[63] Continuation of Ser. No. 518,646, Aug. 24, 1995, abandoned.

[51] Int. Cl.$^6$ ..................................................... C25B 11/00
[52] U.S. Cl. ........................ 204/286; 204/279; 204/280; 204/281; 204/297 R; 204/288; 204/289; 204/290 R; 204/421; 204/265; 204/266; 204/277; 204/278; 204/263; 204/275; 422/120; 422/122; 429/27; 429/30; 429/31; 429/32; 429/38; 429/39; 429/40
[58] Field of Search ..................................... 204/421, 279, 204/280, 281, 286, 290 R, 290 F, 297 R, 265, 288, 289, 266, 277, 278, 263, 275; 422/120, 122; 429/27, 30, 31, 32, 38, 39, 40

[56] References Cited

U.S. PATENT DOCUMENTS

| | | | |
|---|---|---|---|
| 4,640,875 | 2/1987 | Makiel | 429/30 |
| 4,943,494 | 7/1990 | Riley | 429/30 |
| 5,205,990 | 4/1993 | Lawless | 422/121 |
| 5,302,258 | 4/1994 | Renlund et al. | 204/129 |
| 5,306,574 | 4/1994 | Singh et al. | 429/40 |
| 5,385,874 | 1/1995 | Renlund et al. | 501/103 |

*Primary Examiner*—Bruce F. Bell
*Attorney, Agent, or Firm*—Michael H. Wallach

[57] ABSTRACT

A ceramic oxygen generator is described which is capable of modular construction to permit the oxygen generation capacity to be expanded. An ionically conducted ceramic electrolyte is formed into a series of rows and columns of tubes on a tube support member and like electrolyte bodies can be connected together to form a manifold therebetween for oxygen produced in the interiors of the tubes. An electrical connection between tubes is formed such that the anodes and cathodes of tubes in a column are connected in parallel while the tubes in the row are, respectively, connected anode to cathode to form a series connection.

11 Claims, 4 Drawing Sheets

MODULAR CERAMIC OXYGEN GENERATOR

This application is a continuation of application Ser. No. 08/518,646 filed Aug. 24, 1995 now abandoned.

BACKGROUND OF THE INVENTION

This invention relates to devices for separating oxygen from a more complex gas containing oxygen to deliver the separated oxygen for use More particularly, the invention relates to solid state electrochemical devices for separating oxygen from a more complex gas It has been demonstrated that oxygen can be removed from more complex gasses, such as air, by an electrochemical process of ionizing the oxygen molecules transporting the oxygen ions through a solid electrolyte and reforming the oxygen molecules on the opposite electrolyte surface of the electric potential is applied to a suitable catalyzing electrode coating applied to the surface of the electrolyte which is porous to oxygen molecules and which acts to dissociate oxygen molecules into oxygen ions at its interface with the electrolyte. The oxygen ions are transported through the electrolyte to the opposite surface, which is also coated with a catalyzing electrode and electrically charged with the opposite electric potential which removes the excess electrons from the oxygen ions, and the oxygen molecules are reformed.

The material forming the ion conductor, as is known, is a ceramic, and a wide variety of ceramics have been found useful for this purpose. For example, as discussed in U.S. Pat. No. 5,385,874 doped metal oxide ceramics have been found to provide high oxygen ion conductivity. The metal oxide may comprise from about 75% to about 90% of the overall composition, and typical oxides used to form the basis of the compositions may include zirconia, ceria, bismuth oxide, thoria, hafnia and similar materials known in the ceramics art. These are but examples, and the specific selection of material is not a part of the invention described herein.

As discussed, the generation of oxygen from electroded ceramic electrolytes or ion conductors is well knows These principles have been used in a wide variety of structural forms, i.e, the shape of the ceramic electrolyte and the arrangement of electrodes on or within the electrolyte have taken a variety forms. Each of these forms, how ever, has been found to have significant disadvantages in terms of the amount of surface area available for oxygen generation per unit volume and weight, the electrical connections have been difficult to manage, the collection devices for the oxygen output are difficult to manufacture and integrate with the electrolyte and the sources of gas from which oxygen is to be separated often are restricted.

For example, in some of the devices of this type, the ceramic electrolyte is constructed as a large flat plate, and this has significant disadvantages. It is limited in its ability to withstand high output delivery pressures Consequently, the plate must be either thicker, have stiffening ribs or have short spans between the sealed edges all of which add significantly to cost and manufacturing complexity.

U.S. Pat. No. 5,302,258 describes a device where a plurality of tubes each having electrodes on the interior and exterior surfaces thereof, are used The tube design is an improvement in terms of its ability to withstand higher pressures. However, considerable labor cost are are involved for sealing each tube to a manifold and to make the necessary electrical connections to each of the tubes.

U.S. Pat. No. 5,205,990 describes a honeycomb configuration which provides a less expensive way to produce the necessary surface area for the process and is structurally adequate to withstand the higher delivery pressures desirable. The ceramic electrolyte in this configuration has a series of channels, a portion of which are electroded with a first polarity, and the others of which are electroded with a second polarity, these channels are said to form the honeycomb appearance This arrangement has significant disadvantages in the labor required to seal the ends of numerous oxygen collecting channels and the wiring needed to connect those same channels. The alternating rows of oxygen and air channels provide only half the effective surface area as might be available from the amount of ceramic electrolyte used, and the electrical connections throughout this honeycomb structure are intricate and expensive to manufacture.

It is therefore an object of this invention to provide a ceramic oxygen generator having an electrolyte configuration which provides for an increased active surface area per unit volume and weight of ceramic material.

Another object of this invention is to provide a ceramic oxygen generator wherein the electrical connections to the individual anode and cathode surfaces are simplified and less costly to make.

A further object of this invention is to provide a ceramic oxygen generator wherein the manifold structure for receiving the separated oxygen is an integral part of the manufactured generator structure and is less costly to make.

Still another object or this invention is to provide a ceramic oxygen generator which is of a modular configuration and thereby provides a simple "building block" approach to meet differing requirements for amounts of oxygen to be generated.

An additional object of the invention is to provide a ceramic oxygen generator meeting the foregoing objectives which is capable of operating with oxygen containing entrance gasses of a wide variety of pressures.

SUMMARY OF THE INVENTION

The foregoing and other objects are achieved in a modular ceramic oxygen generating system constructed according to the invention wherein an ionically conductive ceramic electrolyte is molded to have a plurality of tubes extending from a support member forming a module. The tubes are closed at the ends thereof outermost from the foregoing surface while open ends of the tube form openings in the support member for the tubes. All surfaces of the electrolyte including the inner and outer surfaces of the tubes and the top and bottom of the sup port member are coated with a porous ionizing electrode material in a continuous fashion. A second coating of a different material may be applied to the same surfaces, if desired, to act as a low resistance current carrier and distributor. The tube-like members are formed into rows and columns on the tube support member. The aforementioned coatings of material are formed into electrical circuits which are created such that the columns of said tubes are connected in parallel while the rows thereof are connected in series. The tube support member includes a lower surface which is adapted to be joined with a like surface of another element to form an oxygen generator module assembly. A number of module assemblies can hi e their output ports connected together to form a system of greater capacity.

BRIEF DESCRIPTION OF THE DRAWINGS

The principles of the intention will be more readily understood by reference to the description of a preferred embodiment given below along with the drawings which are briefly described as follow.

DETAILED DESCRIPTION OF THE DRAWINGS

Figure 1:
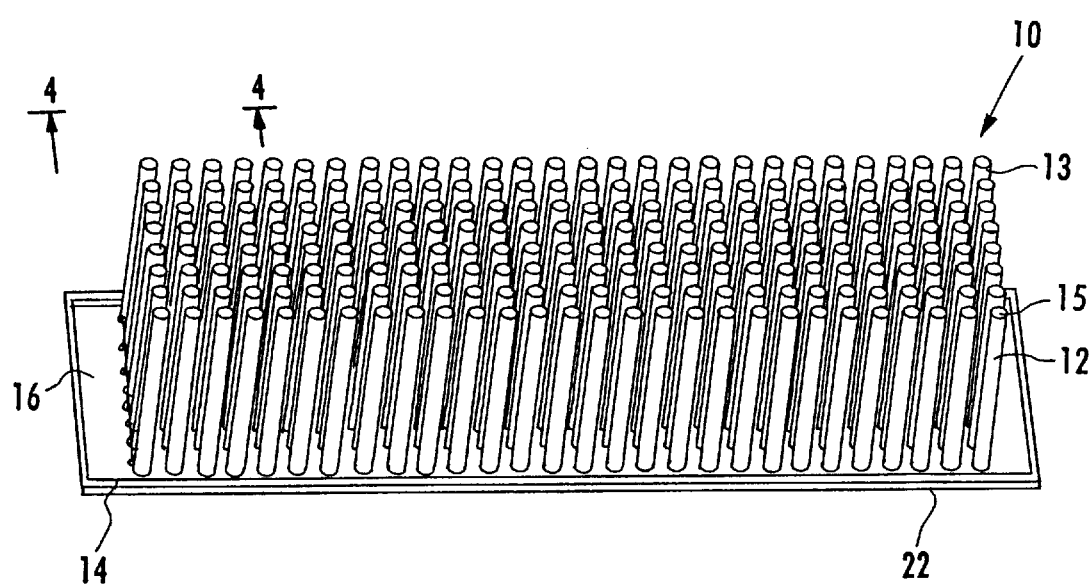
FIG. 1 is a top perspective view of one of the molded, modular elements used to form module assembly of two molded elements creating the ceramic oxygen generator module assembly according to the invention.

In each of the figures of the drawings like elements are referred to with like reference numerals.

The ceramic oxygen generating assembly according to the invention is generally comprised of pairs of molded "building block" or modular elements such as the one depicted in FIG. 1. The modular element 10 can be, for example, injection molded of an ionically conductive ceramic electrolyte and in the configuration shown provides a large surface area per unit volume, and it includes an integral manifold structure (to be described) for collecting oxygen. As is shown in FIG. 2 the symmetry of the modular design of element 10 allows a second element 10' to be inverted and sealed to the first element to form the assembly.

Figure 3:
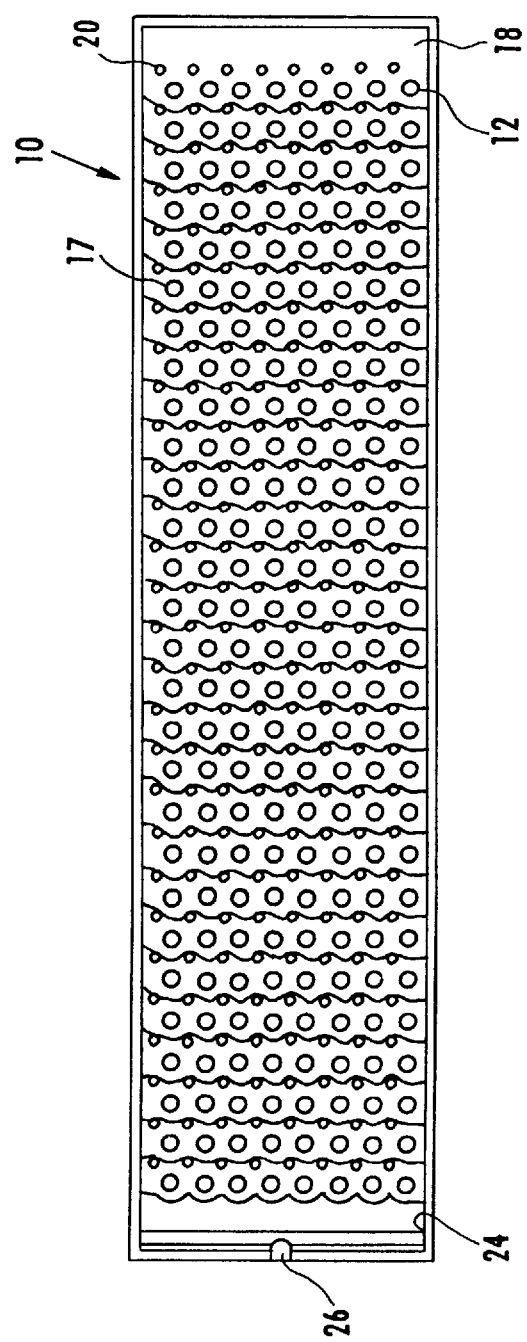
FIG. 3 is a bottom plan view of the FIG. 1 embodiment.

Referring again to FIG. 1, as stated, the element 10 is, for example, formed by an injection molding process from an ionically conductive ceramic electrolyte. By this molting process element 10 is formed into a series of tubes 12 extending from a generally planar tube support member 14 In this embodiment the tubes are formed into 28 columns of 8 tubes each, or stated another way, 8 rows of 28 tubes each. The outer end of each tube 12 is closed at 15. The upper surface 16 and outer surfaces 13 of the tubes 12 along with the closed ends 15 thereof, are then coated with a catalyzing and electrically conductive material. (See FIG. 4). Likewise, the lower surface 18 (FIG. 3) and interiors 17 of each of the tubes 12 are coated with a similar electrically conductive material. These coatings form the two electrode surfaces separated by the ceramic electrolyte As best shown in FIG. 3, a series of vias 20 are provided, which are simply holes extending through the ceramic electrolyte, and these holes are plated through (and filled or plugged) during the electroding process. After the electroding process the electrode material on portions of the upper and lower surfaces 16 and 18 may be burned away to form the desired electrical connections (to be described) through certain vias.

Figure 2:
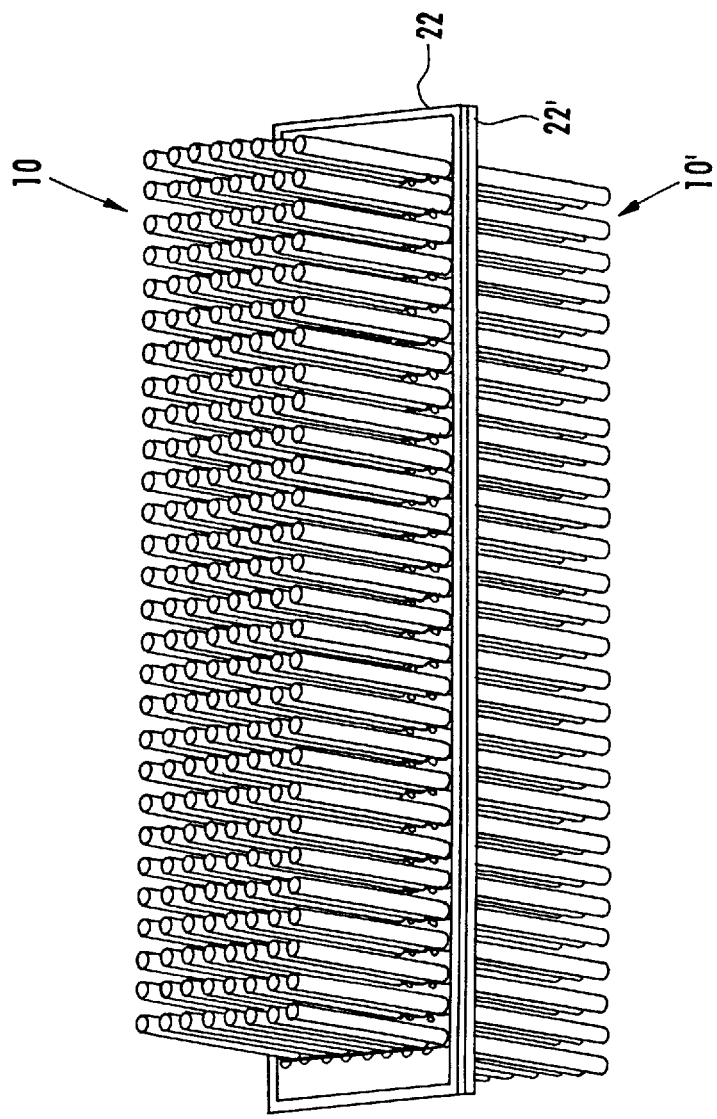
FIG. 2 is a top perspective view of the two of the FIG. 1 molded elements formed into the aforementioned module assembly.

As stated, the elements 10 and 10' forming the FIG. 2 assembly are identical and symmetrical so that they may be placed together in the manner shown in FIG. 2 to form complete assembly. A flange member 22 extends outwardly from the lower surface 18 of tube support member 14 around the perimeter thereof so that when the elements 10 and 10' are placed together as in FIG. 2, the flange members 22 and 22' are joined to form a manifold 24 in the interior therof between the lowwer sufaces 18 of the two elements 10 and 10'. As bes shown in figure 3, an exit port 26 is provided in tube support member 14 to communicate with the interior of manifold 24. Outlet ports could also exit along the longer edges of the elements 10 and 10' to allow side-by-side rather than end-to-end connection of a plurality of assemblies.

Figure 4:
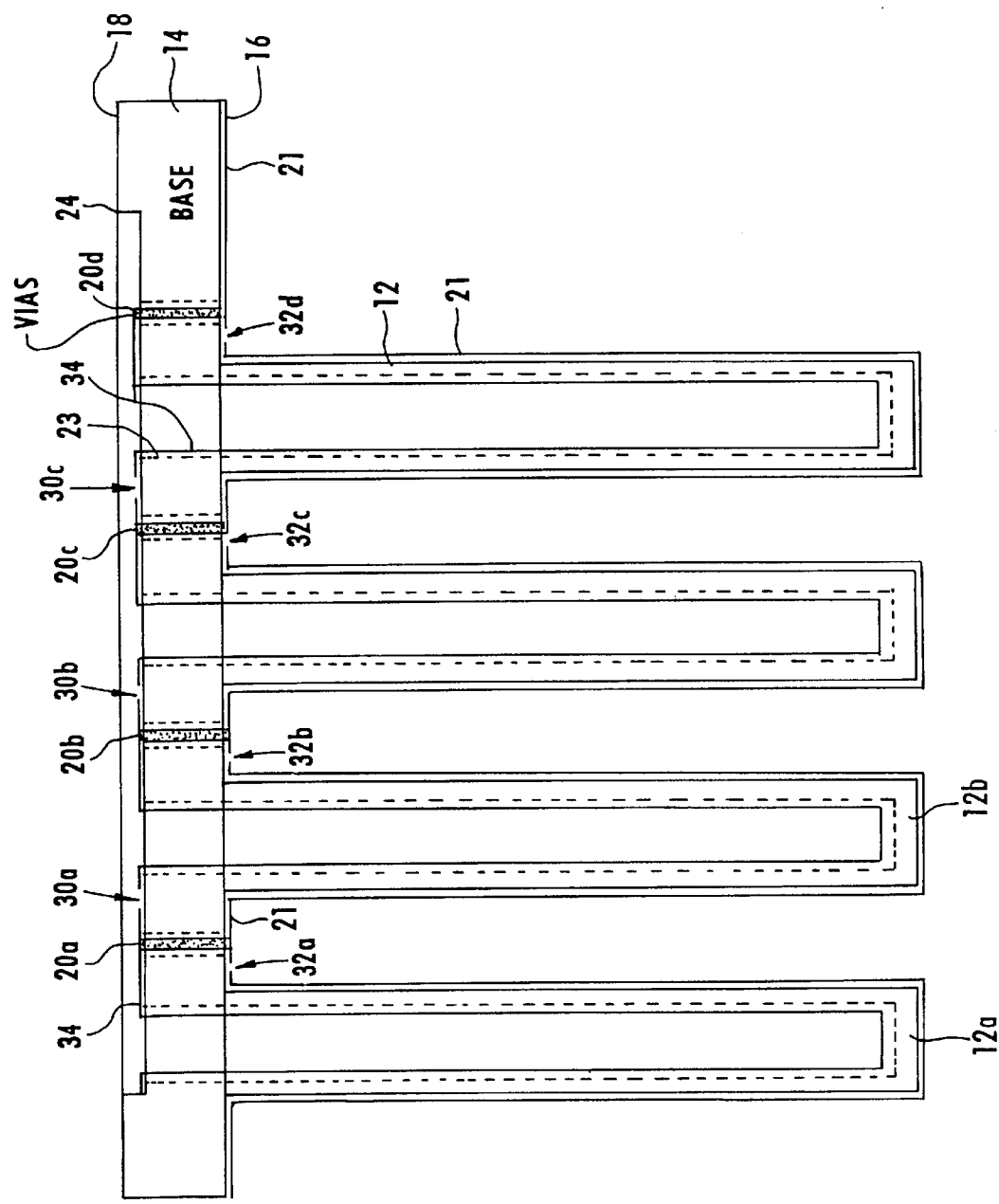
FIG. 4 is a partial cross sectional view taken along the line 4—4 of the FIG. 1 embodiment.

FIG. 4 is a partial cross sectional view taken along the line 4—4 in FIG. 1. Thus, FIG. 4 is a cross sectional view of four tubes from a row of 28 in the described embodiment. As can be seen, the tubes 12 and tube support member 14 are of the ceramic electrolyte material. The outer surfaces 21 of tubes 12 and the upper surface 16 of tube support member 14 are continuously coated with an ionizing and electrically conductive material to form an electrode for the time being continuously covering these surfaces. Likewise, the interior surfaces 23 of tubes 12 are coated with an electrically conductive materials and this coating 34 continues to cover the lower surface 18 of tube support member 14. As mentioned, in this electroding process, the vias 20 extending through tube support member 14 will be filled with the electrically conductive material. The entire surface area is coated such as by a dipping process.

In order to form these coatings into electrical circuits capable of creating oxygen generation devices of the above described type it is necessary to selectively burn away a portion of the electrode material to produce the desired electrical connections. To this end, a series of cuts in the electrode material 24 on the lower surface 18 of tube support member 14 are made as shown at 30 $a$–$c$. These cuts may be made with a suitable laser. These cuts extend longitudinally of the columns the full dimension of tube support member 14 between each of the columns of tubes 12. Likewise, cuts 32 $a$–$d$ are made in the electrode surface 21 formed on the upper surface 16 of tube support member 14. Again, these cuts 32 extend longitudinally the full dimension of tube support member 14 along each column of tubes 12. It will be noted, for example, that cut 32$a$ is made on the side of via 20$a$ nearer tube 12$a$ while cut 30$a$ is made on the side of via 20$a$ nearer tube 12$b$. Thus, a series connection is made between electrode surface 21 of tube 12$b$ and that portion of electrode surface 24 on tube 12$a$. The same relationships will then occur between the first and second electrode surfaces of the next succeeding tubes in the row, and this same relationship will follow in each of the rows. By allowing the electrode material to remain in the vias 20 the best possible low resistance connection between the tubes is formed.

The cuts 30 and 32 made longitudinally of columns of tubes, such as the cuts 30$a$ and 32$a$ between columns formed by tubes 12$a$, 12$b$, and the like cuts between the other columns of tubes, in effect, form the tubes in a column into a parallel electrical circuit.

The result of this arrangement, using the FIG. 1 embodiment as an example, is that in the combination of 28 columns of 8 tubes each (8 rows) the electrodes (first and second electrodes) of each tube in each column of 8 tubes are in parallel electrically. Each of the 28 columns are in series electrically. It should be noted that this arrangement is only examples and the sizes of the tubes and the arrangement of the rows and columns of tubes can be varied allowing the design to be an optimized arrangement of the series and or parallel electrical connections to each tube for best voltage and current distribution In the illustrated example, if it is assumed that the FIG. 1 module receives power from a 24 volt supply, the voltage applied across each tube would be less than one volt because each column of tubes acts in effect, as one of 28 series resistors. The voltage required to effect the ionization and transport oxygen across such a device is affected by several parameters including operating temperature, differential oxygen partial pressure across the generator, ionic conductivity of the electrolyte, electrical resistance of the electrolyte, electrode interface, spreading resistance of the electrode and resistance of the electrical connections to the generator In general, however, this voltage is less than one volt and can be a small fraction of a volt in optimized designs. The number of tubes (or columns of tubes) is dependent on the power supply voltage and the desired voltage to be applied to each tube It is to be understood that each column of 8 tubes (and associated vias) in this example could be further subdivided such that 8 separate series of 28 tubes each are formed. However, nonuniformity of electrode characteristics could cause localized ox reheating and subsequent burnout of one tube resulting in the loss of the series of 28 tubes. Arranging the tubes into columns as shown with multiple vias provides redundancy and normalization of the current flow.

In operation, the air or other gas from which oxygen is to be extracted flows across the tubes 12 and by reason of the principles of ionic conductivity discussed hereinabove, a gas having a higher pressure of oxygen is formed in the interiors of tubes 12 and is collected in manifold 24. This supply of oxygen is communicated via port 26 to the component having the oxygen requirement.

It is to be understood that while circular or cylindrical tubes having exterior and interior surfaces are shown in the described embodiment other configurations for the "tubes" could be us and the term "tube" is used herein only for purposes of convenience of reference.

An alternative arrangement to each column of hollow tubes is a hollow "cantilever shelf" configuration which would provide approximately the same effective surface area. These flat hollow sections with one end molded closed would be manifolded together as the tubes are to provide a common output port. Internal stiffening ribs could be added between the opposing flat walls to increase the ability to withstand internal pressure as required.

The principles of this invention are described hereinabove by describing a preferred embodiment constructed according to those principles. It will be understood that the described embodiment can be modified or changed in a number of ways without departing from the spirit and scope of the invention as defined by the appended claims.

I claim:

1. An ionically conductive ceramic element comprising:
    a plurality of tubes each having interior and exterior surfaces, and each having a closed end and an open end;
    a tube support member receiving open ends of said plurality of tubes;
    a first electrically conductive coating covering said exterior surfaces of said plurality of tubes;
    a second electrically conductive coating covering said interior surfaces of said plurality of tubes; and
    said ionically conductive ceramic element having at least two columns and a first electrode covering an exterior surface of said first column and an interior surface of said second column of tubes and a second electrode covering an exterior surface of said second column of tubes and an interior surface of said first column of tubes;
    said first electrode being connectable to a source of electrical potential at a first polarity and said second electrode being connectable to a source of electrical potential at a second polarity.

2. The ceramic element described in claim 1 wherein said plurality of tubes are formed into rows and columns on said tube support member wherein each tube is connected to said first electrode and said second electrode and first and second electrode portions of each of said tubes in a column are electrically connected in parallel and wherein each of the tubes forming a row are electrically connected in series.

3. The ceramic element described in claim 2 wherein said first and second electrodes are formed by
    cuts in said first and second electrically conductive coatings between said columns of tubes, said cuts extending longitudinally of and between the columns of tubes so that the portions of said first and second electrodes on opposite sides of each said cut are electrically separated, vias extended through said first and second surfaces adjacent each of said tubes and
    electrical connections extending through said vias connecting a first electrode portion of each said tube in a row to a second electrode portion of a tube in an adjacent column in the same row to form a series connection across each row of tubes.

4. The ceramic element described in claim 3 wherein said electrical connections are constituted by the material forming said first and second electrodes coating the surfaces of said ceramic electrolyte extending through said vias.

5. The ceramic element described in claim 1, wherein each the plurality of tubes is spaced from adjacent tubes.

6. An oxygen generator, comprising:
    a first ceramic element having a tube support member and an array of tube members extending from said tube support member and formed into columns and rows;
    a second ceramic element adjacent said first ceramic element; and
    a seal between said first ceramic element and said second ceramic element;
    said first ceramic element having at least two columns and a first electrode covering an exterior surface of said first column and an interior surface of said second column of tubes and a second electrode covering an exterior surface of said second column of tubes and an interior surface of said first column of tubes;
    said first electrode being connectable to a source of electrical potential at a first polarity and said second electrode being connectable to a source of electrical potential at a second polarity.

7. The oxygen generator of claim 6, wherein said first ceramic element includes a first electrically conductive coating covering exterior surfaces of each of said plurality of tube members; and
    wherein said first ceramic element includes a second electrically conductive coating covering interior surfaces of said plurality of tube members.

8. The oxygen generator of claim 6, wherein said first ceramic element is integrally formed.

9. An electrochemical element, comprising:
    a ceramic element having a tube support member and an array of tube members extending from said tube support member;
    wherein said tube support member and said array of tube members are formed from ceramic.

10. The electrochemical element of claim 9, wherein said ceramic element is an electrolyte.

11. The electrochemical element of claim 9, wherein said ceramic element is integrally formed.

* * * * *